(12) United States Patent
Crump et al.

(10) Patent No.: US 6,311,222 B1
(45) Date of Patent: Oct. 30, 2001

(54) TRANSLATOR MEMORY MANAGEMENT SYSTEM

(75) Inventors: Richard Crump, Boston; Janet Doong, Chelmsford; Mark F. Leary, Franklin, all of MA (US)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/167,811

(22) Filed: Oct. 7, 1998

(51) Int. Cl.$^7$ .................................................. G06F 13/00
(52) U.S. Cl. ................................. 709/246; 709/230
(58) Field of Search ................................. 709/246, 230

(56) References Cited

U.S. PATENT DOCUMENTS

| | | | |
|---|---|---|---|
| 5,568,487 | * 10/1996 | Sitbon et al. | 370/466 |
| 5,581,558 | * 12/1996 | Horney, II et al. | 370/401 |
| 5,748,866 | * 5/1998 | Edgar | 345/428 |
| 6,202,096 | * 3/2001 | Williams et al. | 709/230 |

* cited by examiner

*Primary Examiner*—Kenneth R. Coulter
(74) *Attorney, Agent, or Firm*—Bromberg & Sunstein LLP

(57) ABSTRACT

An apparatus for translating a message between a first transmission protocol to a second transmission protocol limits buffer sizes for storing incoming and outcoming message data. To that end, each message has a message size that is no larger than a maximum message size, and the first protocol transports message data with message envelopes having an envelope size that is no larger than a maximum envelope size. The apparatus further includes a first protocol interface for interfacing with first protocol devices that communicate via the first protocol, a second protocol interface for interfacing with second protocol devices that communicate via the second protocol, and control logic that couples the first protocol interface with the second protocol interface.

50 Claims, 5 Drawing Sheets

TRANSLATOR MEMORY MANAGEMENT SYSTEM

CROSS REFERENCE TO RELATED APPLICATIONS

U.S. patent application Ser. No. 09/167,916, now U.S. Pat. No. 6,226,676 entitled CONNECTION ESTABLISHMENT AND TERMINATION IN A MIXED PROTOCOL NETWORK, filed on even date herewith and incorporated by reference in its entirety;

U.S. patent application Ser. No. 09/167,839 entitled ESTABLISHING AND TERMINATING CONNECTIONS IN A MIXED PROTOCOL NETWORK, filed on even date herewith and incorporated by reference in its entirety;

U.S. patent application Ser. No. 09/167,792 entitled SYSTEM FOR TRANSLATING A MESSAGE FROM A FIRST TRANSMISSION PROTOCOL TO A SECOND TRANSMISSION PROTOCOL, filed on even date herewith and incorporated by reference in its entirety;

U.S. patent application Ser. No. 09/167,746 entitled EFFICIENT RECOVERY OF MULTIPLE CONNECTIONS IN A COMMUNICATION NETWORK, filed on even date herewith and incorporated by reference in its entirety; and U.S. patent application Ser. No. 09/167,950 entitled ERROR RECOVERY IN A MIXED PROTOCOL NETWORK, filed on even date herewith and incorporated by reference in its entirety.

FIELD OF THE INVENTION

The invention generally relates networks and, more particularly, the invention relates to translating a message from a first transmission protocol to a second transmission protocol.

BACKGROUND OF THE INVENTION

In today's information age, data communication networks are becoming more pervasive as an ever-increasing number of communication consumers require access to on-line computer resources. To that end, many data communication networks are evolving to meet the needs of these communication consumers. As these data communication networks evolve, it often becomes necessary to combine or integrate network segments that support different communication/transmission protocols.

One well-known communication protocol in widespread use is the X.25 protocol. The X.25 protocol defines the physical, link, and network layer protocols (layers one, two, and three) of the International Standards Organization ("ISO") seven-layer protocol model. In a communication network that utilizes the X.25 protocol (referred to herein as an "X.25 network"), two devices (referred to herein as an "X.25 device" or "X.25 devices") exchange X.25 data packets over a virtual circuit that is established across the X.25 network. One type of virtual circuit commonly used in the X.25 network is a permanent virtual circuit ("PVC"). A PVC is a virtual circuit that is set up automatically within the X.25 network and remains active as long as the X.25 network is operative. Unlike a PVC, a switched virtual circuit ("SVC") is set up only when explicitly requested by an X.25 device. Typical X.25 networks support both permanent and switched multiple virtual circuits. As is known in the art, a data message typically is encapsulated within an X.25 transmission envelope for transmission via the PVC or SVC.

Another well-known communication protocol in widespread use is the Transmission Control Protocol ("TCP"). TCP is a connection-oriented transport layer protocol that is generally used in conjunction with a connectionless network layer protocol known as the Internet Protocol ("IP"). In a communication network that utilizes the TCP protocol (referred to herein as a "TCP/IP network"), two devices (referred to herein as a "TCP device" or "TCP devices") exchange TCP data segments over a TCP connection that is established across the TCP/IP network. In order to set up the TCP connection within the TCP/IP network, one TCP device transmits a specially formatted message (referred to herein as a "TCP SYN message") that includes, among other things, an IP address identifying the destination TCP device and a TCP port number identifying one of a number of applications supported by the destination TCP device. The combination of IP address and TCP port number is referred to herein as a "socket." Because the TCP connection is set up only when explicitly requested by a TCP device, the TCP connection is considered to be a switched connection and thus, is not considered to be a permanent connection. As is known in the art, a message is transmitted via the TCP protocol by means of a TCP segment.

Because both the X.25 protocol and the TCP protocol are in widespread use, it has become desirable for X.25 devices to communicate with TCP devices in certain data communication networks. Undesirably, the X.25 protocol is sufficiently different from the TCP protocol that X.25 devices cannot inherently communicate with TCP devices.

SUMMARY OF THE INVENTION

In accordance with one aspect of the invention, an apparatus for translating a message between a first transmission protocol to a second transmission protocol limits buffer sizes for storing incoming and outgoing message data. To that end, each message has a message size that is no larger than a maximum message size, and the first protocol transports message data with message envelopes having an envelope size that is no larger than a maximum envelope size. The apparatus further includes a first protocol interface for interfacing with first protocol devices that communicate via the first protocol, a second protocol interface for interfacing with second protocol devices that communicate via the second protocol, and control logic that couples the first protocol interface with the second protocol interface.

The first protocol interface has a first memory pool for storing message data received from the control logic, and a second memory pool for storing message data to be transmitted to the control logic. The first memory buffer pool includes a plurality of first buffers that each have a maximum size that is no larger than the sum of the maximum message size and additional header data. In a similar manner, the second memory buffer pool has a plurality of second buffers that each have a maximum size that is no larger than the sum of the maximum message size and additional header data.

The first protocol interface further may include an accumulator for accumulating message data from message envelopes received from first protocol devices until a complete message is received. The apparatus also may include a message producer that retrieves the accumulated message data and appends a length datum field to the retrieved message data.

In preferred embodiments, the first protocol is a stream based protocol and the second protocol is a packet based protocol. In other embodiments, the first protocol is a packet based protocol and the second protocol is a stream based protocol.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
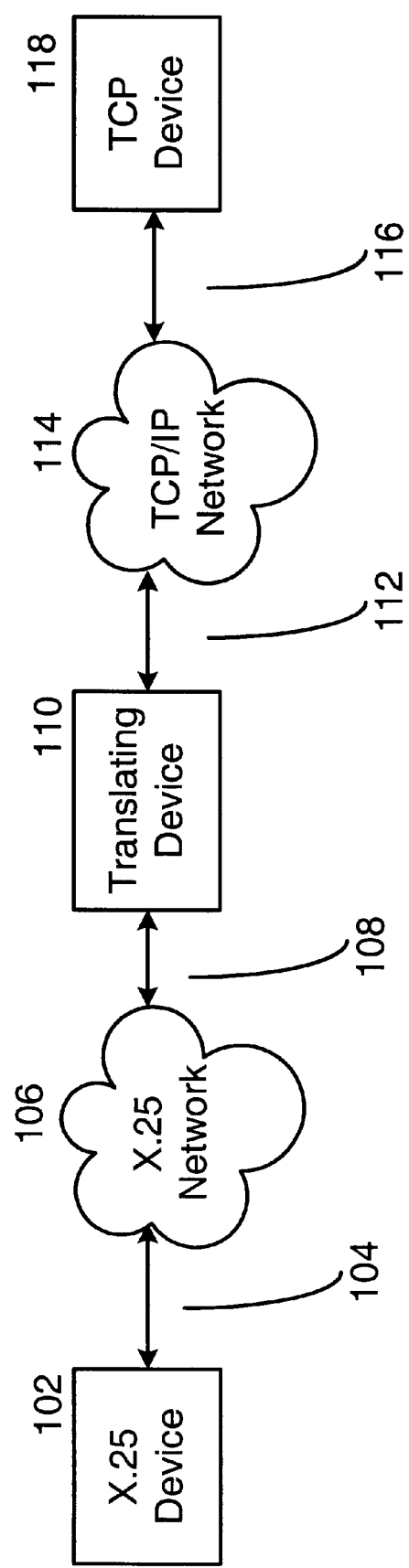
FIG. 1 schematically shows an exemplary data communication network in which an X.25 device communicates with a TCP device through a translating device.

FIG. 1 schematically shows an exemplary data communication network 100 in which an X.25 device 102 communicates with a TCP device 118 through a translating device 110 (a/k/a translator 110). More specifically, the X.25 device 102 is coupled to an X.25 network 106 by way of a first X.25 link 104. The translating device 110 also is coupled to the X.25 network 106 by way of a second X.25 link 108. In preferred embodiments, the X.25 device 102 communicates with the translating device 110 over the X.25 network 106 using the X.25 protocol over a dedicated PVC that is established between the X.25 device 102 and the translating device 110. When communicating with the X.25 device 102 over the dedicated PVC, the translating device 110 acts, and appears to the X.25 device 102, as another X.25 device.

In a similar manner, the TCP device 118 is coupled to a TCP/IP network 114 by way of a first TCP/IP link 116. The translating device 110 also is coupled to the TCP/IP network 114 by way of a second TCP/IP link 112. In preferred embodiments, the TCP device 118 communicates with the translating device 110 over the TCP/IP network 114 using the TCP protocol over a TCP connection that is established between the TCP device 118 and the translating device 110. When communicating with the TCP device 118 over the TCP connection, the translating device 110 acts, and appears to the TCP device 118, as another TCP device.

Figure 2:
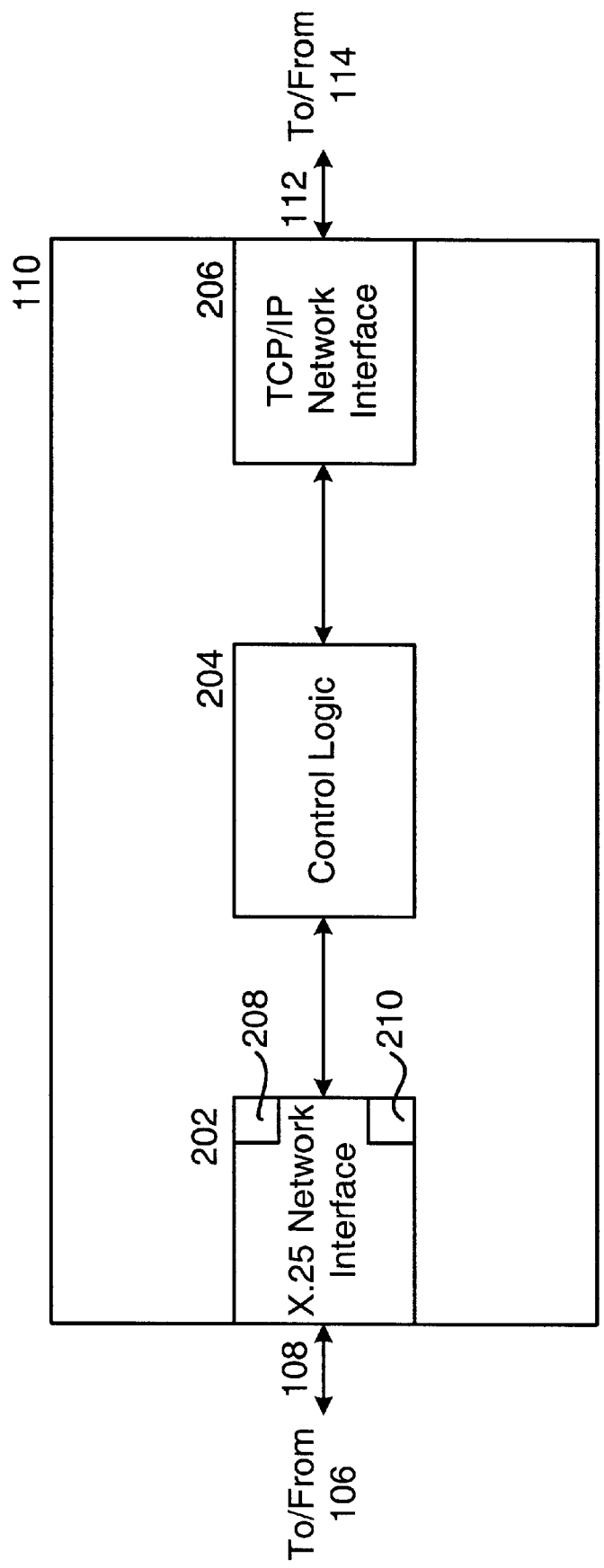
FIG. 2 schematically shows an exemplary translating device that is configured in accordance with a preferred embodiment of the present invention.

FIG. 2 schematically shows an exemplary translating device 110 that is configured in accordance with a preferred embodiment of the present invention. Among other things, the translating device 110 includes an X.25 network interface 202 for interfacing with the X.25 network 106, a TCP/IP network interface 206 for interfacing with the TCP/IP network 114, and control logic 204 for translating from one of the network protocols to the other of the two network protocols. Each element of the translating device 110 is discussed in greater detail below.

The X.25 network interface 202, which is coupled to the X.25 link 108, includes logic enabling the translating device 110 to communicate over the X.25 network 106. To that end, the X.25 network interface 202 includes both logic for receiving X.25 messages from the X.25 link 108, and logic for transmitting X.25 messages generated within the translating device 110 onto the X.25 link 108.

The TCP/IP network interface 206, which is coupled to the TCP link 112, preferably includes logic for enabling the translating device 110 to communicate over the TCP/IP network 114. To that end, the TCP/IP network interface 206 includes both logic for receiving TCP segments from the TCP link 112, and logic for transmitting TCP segments generated within the translating device 110 onto the TCP link 112.

The control logic 204 performs a number of different functions (some of which are described in detail below) to allow any X.25 device, such as the X.25 device 102, to communicate with any TCP device, such as the TCP device 118. The control logic 204 is operably coupled to both the X.25 network interface 202 for receiving and transmitting X.25 messages, and to the TCP/IP network interface 206 for receiving and transmitting TCP segments.

In order for the X.25 device 102 to communicate with the TCP device 118 within the data communication network 100, it is necessary for an end-to-end connection to be established between the X.25 device 102 and the TCP device 118. Such connection may be established by many methods, such as that disclosed in copending U.S. patent application entitled, "CONNECTION ESTABLISHMENT AND TERMINATION IN A MIXED PROTOCOL NETWORK", having U.S. patent application Ser. No. 09/167,916, now U.S. Pat. No. 6,226,676, filed on even date herewith and naming Richard Crump, Mark Leary, and Ellis Wong as inventors. For example, either one of the X.25 device 102 or the TCP device 118 may initiate the connection.

In accord with preferred embodiments of the invention, the X.25 network interface 202 preferably includes an inbound buffer pool with a plurality of individual pool buffers 208 (FIG. 2). Each input pool buffer has a size that is no greater than the sum of the size of a message that is transmitted from the X.25 device to the TCP device, and any header data that is utilized with the message data by the X.25 network interface 202. In accord with further embodiments of the invention, the X.25 network interface 202 also includes an outbound buffer pool with a plurality of individual outbound pool buffers 210 (FIG. 2). Each outbound pool buffer has a size that is no greater than the sum of the maximum X.25 packet size of a packet that may be transmitted to the X.25 device, and any header data. Header data may be, for example, header data that is utilized with the message data transmitted by the X.25 packets, or internal header data for internal processes within the X.25 interface 202.

In preferred embodiments, the total number of inbound pool buffers is not the same as the total number of outbound pool buffers. Both pools, however, may have like numbers of individual buffers. In a similar manner, the size of each of the inbound pool buffers may be different or the same as that of the outbound pool buffers.

Figure 3:
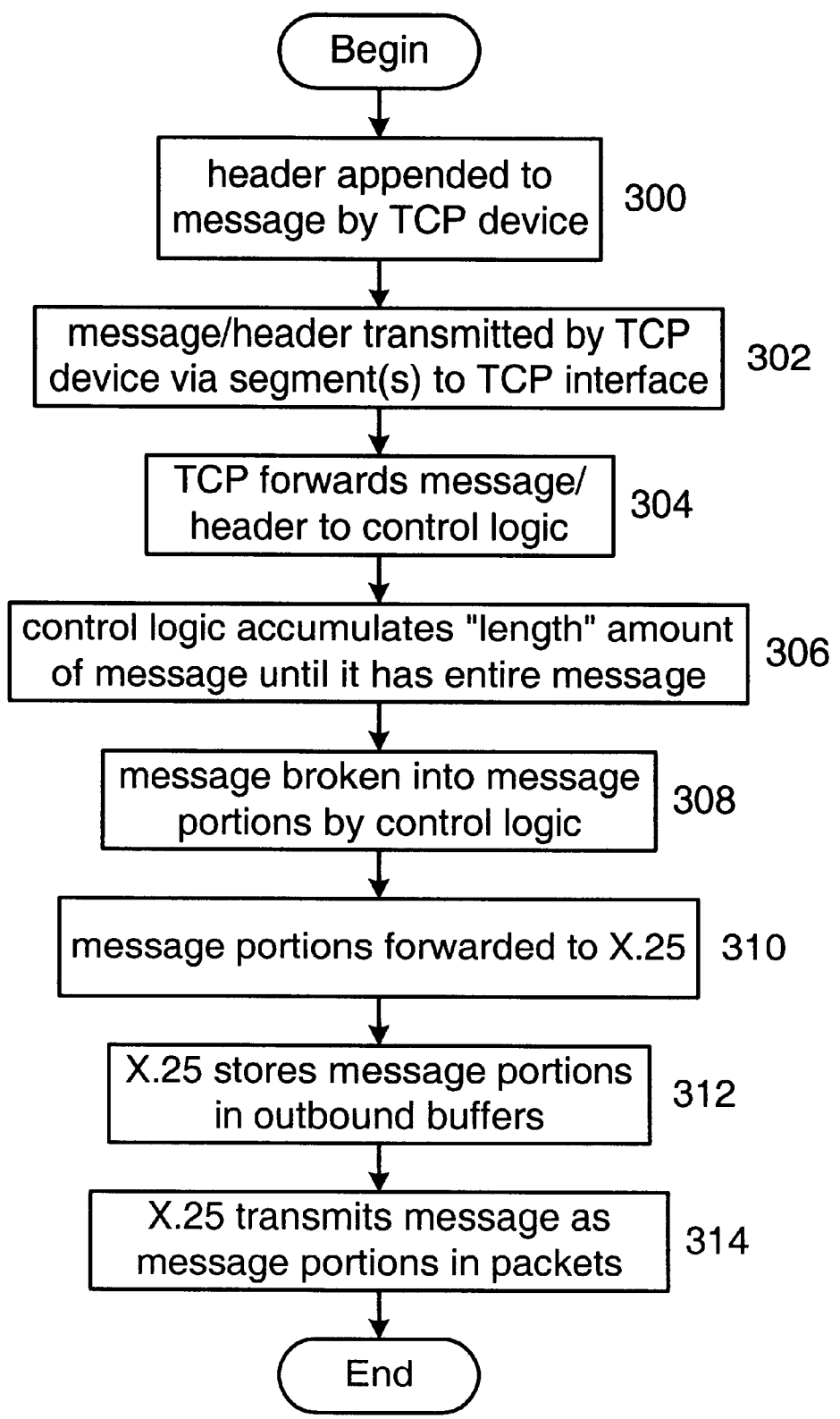
FIG. 3 shows a preferred process of transmitting a message from a TCP device to an X.25 device via a translator.

FIG. 3 shows a preferred process of transmitting a message from the TCP device to the X.25 device via the translator. Some details of this and other embodiments are discussed in previously mentioned copending U.S. patent application Ser. No. 09/167,792 entitled, "SYSTEM FOR TRANSLATING A MESSAGE FROM A FIRST TRANSMISSION PROTOCOL TO A SECOND TRANSMISSION PROTOCOL", filed on even date herewith and naming Ellis Wong as inventor. The process begins at step 300 in which a header having a length field is appended to the message by the TCP device. The length of the message, which preferably is calculated by the TCP device, is entered into the length field. The message/header combination then is transmitted by the TCP device to the TCP interface 206 via one or more segments (step 302). The TCP interface 206 responsively extracts the message/header data from the received segments and forwards them to the control logic 204 (step 304). In preferred embodiments, this may be performed by storing the message/header data retrieved from the segments in a first-in, first-out buffer (not shown) that is accessible by the control logic 204.

The process continues to step 306 in which the control logic 204 accumulates the amount of message data as specified by the length field. More particularly, in preferred embodiments, the control logic 204 reads the length data from the front of the buffer and retrieves the amount specified by the length data of additional message data in the above noted first-in, first-out buffer.

The process then continues to step 308 in which the complete message is broken into message portions by the control logic 204. The message portions preferably are no larger than the maximum amount of message data that a packet can transport as a payload.

The message portions then preferably are sequentially forwarded to the X.25 interface 202 at step 310, and consequently stored in the outbound pool buffers (step 312). In preferred embodiments, the outbound pool buffers are utilized to form the data packets in accord with X.25 processes. The process continues to step 314 in which the X.25 interface 202 transmits message portions from the outbound pool buffers to the X.25 device via X.25 packets.

Figure 4:
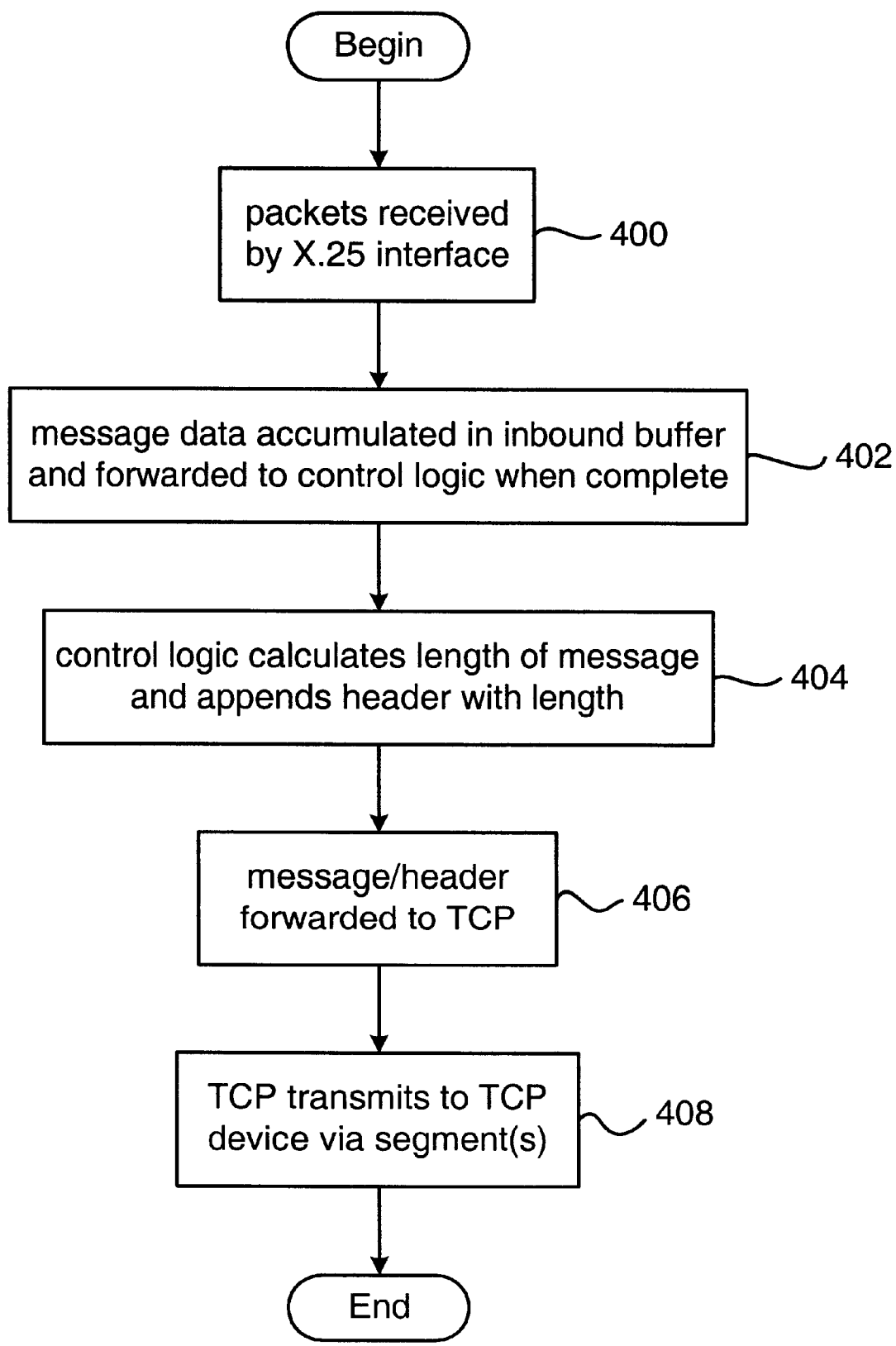
FIG. 4 shows a process of transmitting a message from an X.25 device to a TCP device via a translator.

FIG. 4 similarly shows a process of transmitting a message from the X.25 device to the TCP device via the translator. The process begins at step 400 in which X.25 packets are received by the X.25 interface 202. The packets each include message data that collectively comprise the message transmitted from the X.25 device. The process continues to step 402 in which the message data within each packet is accumulated in one of the inbound pool buffers. Once the entire message is accumulated in such inbound pool buffer, then it is forwarded to the control logic 204.

Upon receipt of the entire message, the control logic 204 calculates the length of the message, and appends a header with a length field to the message (step 404). The length field is set to a value equal to the calculated message length. The message with appended header then is forwarded to the TCP interface 206 at step 406 for transmission to the TCP device. The TCP interface 206 subsequently transmits the entire message with header to the TCP device via one or more segments (step 408), thus completing the process. Upon receipt of each of the required segments, the TCP device utilizes the length field in the header to reconstruct the entire message.

Figure 5A:
FIG. 5A shows an exemplary message without a header prior to being added to a TCP segment.
Figure 5B:
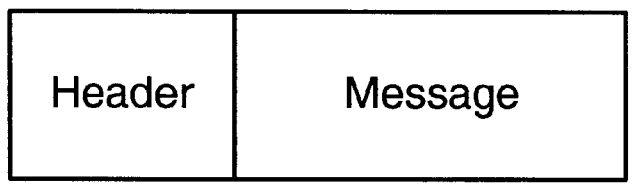
FIG. 5B shows the message having an appended header.
Figure 5C:
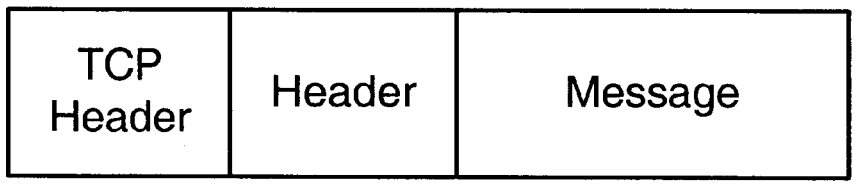
FIG. 5C shows the message and header combination of FIG. 5B within a TCP segment.

FIG. 5A shows an exemplary message without a header prior to being added to a TCP segment. FIG. 5B shows the message having an appended header (the combination of which is referred to herein as the "message and header combination"). FIG. 5C shows the message and header combination of FIG. 4B within a TCP segment (i.e., a data envelope). As is known in the art, the TCP segment includes a TCP header.

In alternative embodiments, the header may be a footer, or datum fields dispersed at other locations within the message data. In such case, the control logic 204 is preconfigured to locate the such datum fields at the appropriate locations. In addition, the such datum may include other data fields. For example, the data fields may include a "type" field, a "version" field, or other field that may be utilized to facilitate data transmission.

It should be noted that although specific transport protocols are discussed, such protocols are discussed by example only and should not be construed to limit the scope of the invention. Accordingly, principles of preferred embodiments of the invention may be applied to other similar and dissimilar protocols. For example, principles of preferred embodiments may be applied to end devices utilizing identical or dissimilar transport protocols. In addition, principles of the invention may be applied to translators that translate between packet based protocols and stream based protocols. In addition to X.25, other exemplary packet based protocols include Asynchronous Transfer Mode "ATM") and Systems Network Architecture "SNA"). Other exemplary stream based protocols include voice and video protocols.

Preferred embodiments of the invention may be implemented in any conventional computer programming language. For example, preferred embodiments may be implemented in a procedural programming language (e.g., "C") or an object oriented programming language (e.g., "C++"). Alternative embodiments of the invention may be implemented as preprogrammed hardware elements, or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A translator for translating messages between a first protocol and a second protocol, each message having a message size that is no larger than a maximum message size, the first protocol transporting message data with message envelopes having an envelope size that is no larger than a maximum envelope size, the translator comprising:

a first protocol interface for interfacing with first protocol devices that cormnunicate via the first protocol;

a second protocol interface for interfacing with second protocol devices the communicate via the second protocol; and control logic coupling the first protocol interface and the second protocol interface, the first protocol interface having a first memory buffer pool for storing message data received from the control logic, the first memory buffer pool having a plurality of first buffers that each have a maximum size that is no larger than the sum of the maximum envelope size and additional header data.

2. The translator as defined by claim 1 wherein the first protocol interface also has a second memory buffer pool for storing message data to be transmitted to the control logic, the second memory buffer having a plurality of second buffers that each have a maximum size that is no larger than the sum of the maximum message size and additional header data.

3. The translator as defined by claim 1 wherein the first protocol interface further includes an accumulator for accumulating message data from message envelopes received from first protocol devices until a complete message is received.

4. The translator as defined by claim 3 further including a message producer that retrieves the accumulated message data and appends a length datum field to the retrieved message data.

5. The translator as defined by claim 1 wherein the control logic includes a message portion producer that breaks message data into message portions.

6. The translator as defined by claim 1 wherein the control logic includes a forwarder that forwards message portions to the first protocol interface for storage in the first memory buffer pool.

7. A translator for translating messages between a first protocol and a second protocol, each message having a message size that is no larger than a maximum message size, the first protocol transporting message data with message envelopes having an envelope size that is no larger than a maximum envelope size, the translator comprising:

a first protocol interface for interfacing with first protocol devices that communicate via the first protocol;

a second protocol interface for interfacing with second protocol devices the communicate via the second protocol; and control logic coupling the first protocol interface and the second protocol interface;

the first protocol interface having a first memory buffer pool for storing message data received from the control logic, the first memory buffer pool having a plurality of first buffers that each have a maximum size that is no larger than the sum of the maximum message size and additional header data, the first protocol interface also having a second memory buffer pool for storing message data to be transmitted to the control logic, the second memory buffer having a plurality of second buffers that each have a maximum size that is no larger than the sum of the maximum message size and additional header data.

8. The translator as defined by claim 7 wherein the first protocol interface further includes an accumulator for accumulating message data from message envelopes received from first protocol devices until a complete message is received.

9. The translator as defined by claim 8 further including a message producer that retrieves the accumulated message data and appends a length datum field to the retrieved message data.

10. The translator as defined by claim 7 wherein the control logic includes a message portion producer that breaks message data into message portions.

11. The translator as defined by claim 7 wherein the control logic includes a forwarder that forwards message portions to the first protocol interface for storage in the first memory buffer pool.

12. The translator as defined by claim 7 wherein the first protocol is a packet based protocol.

13. The translator as defined by claim 12 wherein the first protocol is X.25.

14. The translator as defined by claim 7 wherein the second protocol is a stream based protocol.

15. The translator as defined by claim 14 wherein the second protocol is TCP.

16. The translator as defined by claim 7 wherein the maximum message size is larger than the maximum envelope size.

17. A method of managing memory within a translator that translates messages between a first protocol and a second protocol, the translator further having a first protocol interface for interfacing with first protocol devices, a second protocol interface for interfacing with second protocol devices, and control logic for coupling the first and second interfaces, the first protocol transporting message data with message envelopes, the method comprising:

determining the maximum size of any message that is translated by the translator;

determining the maximum size of any message envelope to be utilized by the translator;

forming, from the memory, a first plurality of memory buffers for storing message data received from the control logic, the first memory buffer having a maximum size that is no larger than the message size and additional header data;

forming, from the memory, a second plurality of memory buffers for storing message data to be transmitted to the control logic, the second memory buffer having a maximum size that is no larger than the sum of maximum message size and additional header data.

18. The method as defined by claim 17 wherein the maximum message size and the maximum envelope size are preselected prior to transmission of the message through the translator.

19. The method as defined by claim 18 further comprising:

retrieving message data from the accumulated envelopes; and appending a length datum field to the message data.

20. The method as defined by claim 17 further comprising breaking the message data into message portions.

21. The method as defined by claim 20 wherein the control logic forwards message portions to the first protocol interface.

22. A computer program product for use on a computer system for managing memory within a translator that translates messages between a first protocol and a second protocol, the translator having a first protocol interface for interfacing with first protocol devices, a second protocol interface for interfacing with second protocol devices, and control logic for coupling the first and second interfaces, the first protocol transporting message data with message envelopes, the computer program product comprising a computer usable medium having computer readable program code thereon, the computer readable program code including:

program code for determining the maximum size of any message that is translated by the translator;

program code for determining the maximum size of any message envelope to be utilized by the translator;

program code for forming, from the memory, a first plurality of memory buffers for storing message data received from the control logic, the first memory buffer having a maximum size that is no larger than the message size and additional header data;

program code for forming, from the memory, a second plurality of memory buffers for storing message data to be transmitted to the control logic, the second memory buffer having a maximum size that is no larger than the sum of maximum message size and additional header data.

23. The computer program product as defined by claim 22 wherein the maximum message size and the maximum envelope size are preselected prior to transmission of the message through the translator.

24. The computer program product as defined by claim 22 further comprising:

program code for accumulating the message data from envelopes received from first protocol devices until a preselected number of message envelopes have been received.

25. The computer program product as defined by claim 24 further comprising:

program code for appending a length datum field to the message data.

26. The computer program product as defined by claim 22 wherein the first protocol is packet based and the second protocol is stream based.

27. A method of managing memory within a translator that translates messages between a first protocol and a second protocol, the translator further having a first protocol interface for interfacing with first protocol devices, a second protocol interface for interfacing with second protocol devices, and control logic for coupling the first and second interfaces, the first protocol transporting message data with message envelopes, the method comprising:

determining the maximum size of any message that is translated by the translator;

determining the maximum size of any message envelope to be utilized by the translator; and forming, from the memory, a first plurality of memory buffers for storing message data received from the control logic, the first plurality of memory buffers each having a maximum size that is no larger than the determined maximum message envelope size and additional header data.

28. The method as defined by claim 27 further comprising:

forming, from the memory, a second plurality of memory buffers for storing message data to be transmitted to the control logic, the second plurality of memory buffers each having a maximum size that is no larger than the sum of maximum message size and additional header data.

29. The method as defined by claim 27 wherein the maximum message size and the maximum envelope size are preselected prior to transmission of the message through the translator.

30. The method as defined by claim 27 further comprising:

retrieving message data from the accumulated envelopes; and appending a length datum field to the message data.

31. The method as defined by claim 27 further comprising breaking the message data into message portions.

32. The method as defined by claim 31 wherein the control logic forwards message portions to the first protocol interface.

33. A computer program product for use on a computer system for managing memory within a translator that translates messages between a first protocol and a second protocol, the translator having a first protocol interface for interfacing with first protocol devices, a second protocol interface for interfacing with second protocol devices, and control logic for coupling the first and second interfaces, the first protocol transporting message data with message envelopes, the computer program product comprising a computer usable medium having computer readable program code thereon, the computer readable program code including:

program code for determining the maximum size of any message that is translated by the translator;

program code for determining the maximum size of any message envelope to be utilized by the translator; and program code for forming, from the memory, a first plurality of memory buffers for storing message data received from the control logic, the first plurality of memory buffers each having a maximum size that is no larger than the maximum message envelope size and additional header data.

34. The computer program product as defined by claim 33 further comprising:

program code for forming, from the memory, a second plurality of memory buffers for storing message data to be transmitted to the control logic, the second plurality of memory buffers each having a maximum size that is no larger than the sum of maximum message size and additional header data.

35. The computer program product as defined by claim 33 wherein the maximum message size and the maximum envelope size are preselected prior to transmission of the message through the translator.

36. The computer program product as defined by claim 33 further comprising:

program code for accumulating the message data from envelopes received from first protocol devices until a preselected number of message envelopes have been received.

37. The computer program product as defined by claim 33 further comprising:

program code for appending a length datum field to the message data.

38. The computer program product as defined by claim 33 wherein the first protocol is packet based and the second protocol is stream based.

39. A translator for translating messages between a first protocol and a second protocol, each message having a message size that is no larger than a maximum message size, the first protocol transporting message data with message envelopes having an envelope size that is no larger than a maximum envelope size, the translator comprising:

a first protocol interface for interfacing with first protocol devices that communicate via the first protocol;

a second protocol interface for interfacing with second protocol devices the communicate via the second protocol; and control logic coupling the first protocol interface and the second protocol interface,
the first protocol interface also having a first memory buffer pool for storing message data to be transmitted to the control logic, the first memory buffer having a plurality of first buffers that each have a maximum size that is no larger than the sum of the maximum message size and additional header data.

40. The translator as defined by claim 39 wherein the first protocol interface has a second memory buffer pool for storing message data received from the control logic, the second memory buffer pool having a plurality of second buffers that each have a maximum size that is no larger than the sum of the maximum envelope size and additional header data.

41. The translator as defined by claim 39 wherein the first protocol interface further includes an accumulator for accumulating message data from message envelopes received from first protocol devices until a complete message is received.

42. The translator as defined by claim 39 wherein the control logic includes a forwarder that forwards message portions to the first protocol interface for storage in the first memory buffer pool.

43. A method of managing memory within a translator that translates messages between a first protocol and a second protocol, the translator further having a first protocol interface for interfacing with first protocol devices, a second protocol interface for interfacing with second protocol devices, and control logic for coupling the first and second interfaces, the first protocol transporting message data with message envelopes, the method comprising:
    determining the maximum size of any message that is translated by the translator;
    determining the maximum size of any message envelope to be utilized by the translator; and
    forming, from the memory, a first plurality of memory buffers for storing message data to be transmitted to the control logic, the first plurality of memory buffers each having a maximum size that is no larger than the sum of maximum message size and additional header data.

44. The method as defined by claim 43 further comprising:
    forming, from the memory, a second plurality of memory buffers for storing message data received from the control logic, the second plurality of memory buffers each having a maximum size that is no larger than the determined maximum envelope size and additional header data.

45. The method as defined by claim 43 further comprising:
    retrieving message data from the accumulated envelopes; and
    appending a length datum field to the message data.

46. The method as defined by claim 43 further comprising breaking the message data into message portions.

47. A computer program product for use on a computer system for managing memory within a translator that translates messages between a first protocol and a second protocol, the translator having a first protocol interface for interfacing with first protocol devices, a second protocol interface for interfacing with second protocol devices, and control logic for coupling the first and second interfaces, the first protocol transporting message data with message envelopes, the computer program product comprising a computer usable medium having computer readable program code thereon, the computer readable program code including:
    program code for determining the maximum size of any message that is translated by the translator;
    program code for determining the maximum size of any message envelope to be utilized by the translator; and
    program code for forming, from the memory, a first plurality of memory buffers for storing message data to be transmitted to the control logic, the first plurality of memory buffers each having a maximum size that is no larger than the sum of maximum message size and additional header data.

48. The computer program product as defined by claim 47 further comprising:
    program code for forming, from the memory, a second plurality of memory buffers for storing message data received from the control logic, the second plurality of memory buffers each having a maximum size that is no larger than the maximum message envelope size and additional header data.

49. The computer program product as defined by claim 47 wherein the maximum message size and the maximum envelope size are preselected prior to transmission of the message through the translator.

50. The computer program product as defined by claim 47 further comprising:
    program code for accumulating the message data from envelopes received from first protocol devices until a preselected number of message envelopes have been received.

* * * * *